June 27, 1967 A. S. BLACKSTONE 3,327,460

BLADE ASSEMBLY FOR A ROTARY MOWER

Filed Sept. 30, 1964

INVENTOR.
ARNOLD S. BLACKSTONE
BY
*[signature]*
ATTORNEYS an# United States Patent Office 3,327,460
Patented June 27, 1967

3,327,460
BLADE ASSEMBLY FOR A ROTARY MOWER
Arnold S. Blackstone, 1716 Perrysburg-Holland Road,
Holland, Ohio 43528
Filed Sept. 30, 1964, Ser. No. 400,417
18 Claims. (Cl. 56—295)

This invention relates to a blade assembly for a rotary mower and more particularly to such an assembly comprising a cutter bar and replaceable cutting blades therefor.

In recent years, rotary lawn mowers have become widely accepted by the homeowner because such mowers are easy to handle and are relatively inexpensive, as well as being reliable because of their simplicity. The blades of such mowers, however, require periodic sharpening which many homeowners consider beyond the scope of their ability and, in any event, is a time consuming job. The hardened steel used in the blades requires a considerable amount of grinding or filing, usually resulting in a less than adequate sharpening job, and particularly so if there are nicks existing in the cutting edge. Consequently, the cutting efficiency of the blade is decreased and the grass is often more shredded than cut, producing a brown appearance due to the shredded ends of the grass blades. Further, the sharpening by the homeowner eventually results in an unbalanced condition of the mower blade over a period of time, thereby causing vibrations which hamper the mowing operation and cause failure of the motor bearings.

To overcome these problems, it has been proposed heretofore to employ replaceable cutting blades with a cutter bar. With this arrangement, when the cutting edges become dull, the blades are simply removed from the cutter bar and replaced by new ones. Cutting blades, however, are subjected to extreme shock when encountering stones and other foreign material at high rates of speed. With replaceable cutting blades heretofore known, such impacts have caused the replaceable blades to become disengaged from the cutter bar or to shear the fasteners holding the blades to the bar, thereby causing the blades or fasteners to be thrown outwardly at bullet-like speeds. Injuries resulting from such discharges of rotary mowers are well known and require no discussion. In addition, the replaceable blade arrangements heretofore known have been relatively complex with resulting high costs, rendering the blade assemblies unsuitable for commercial applications. Still other cutter bars have used replaceable cutting blades which are assembled with sliding fits, the blades having a tendency to work loose and drop off the cutter bar after a period of operation.

The present invention relates to a mower blade assembly comprising a simple cutter bar and a pair of replaceable blades which are attached to the cutter bar by conventional fasteners. The cutting blades and cutter bar cooperate with one another in a manner such that any impact on the replaceable blades is transmitted directly to the cutter bar rather than through the fasteners. Hence, the purpose of the fasteners is only to attach the blades to the bar and resist centrifugal force tending to throw the blades outwardly from the bar.

In a preferred embodiment of the invention, the cutting blades are made with offsets to provide vertical surfaces engageable with the forward edges of the cutter bar when the blades are fastened thereto. In such a case, the cutter bar itself is of simple elongate design with the only extra machining operations necessary being the holes in the bar to receive the fasteners. In another embodiment of the invention, the cutting blades are of simple planar design and end portions of the cutter bar are coined to provide recesses with radially-extending, vertical surfaces which the rear edges of the cutting blades engage when fastened to the cutter bar in the recesses. Again, impact on the cutting blades is transmitted directly to the cutter bar through the engaged surfaces and not through the fasteners attaching the blades to the cutter bar.

It is, therefore, a prinicpal object of the invention to provide a cutting blade assembly for a lawn mower, which assembly includes a cutter bar and replaceable cutting blades attached to the bar in a manner such that impact on the blades is transmitted directly to the bar.

Another object of the invention is to provide a cutting blade assembly which is of simplified, low-cost design.

Still another object of the invention is to provide a blade assembly having simple and reliable fasteners for securing the blades to a cutter bar.

Other objects and advantages of the invention will be apparent from the following detailed description of preferred embodiments thereof, reference being made to the accompanying drawings, in which.

Figure 1:
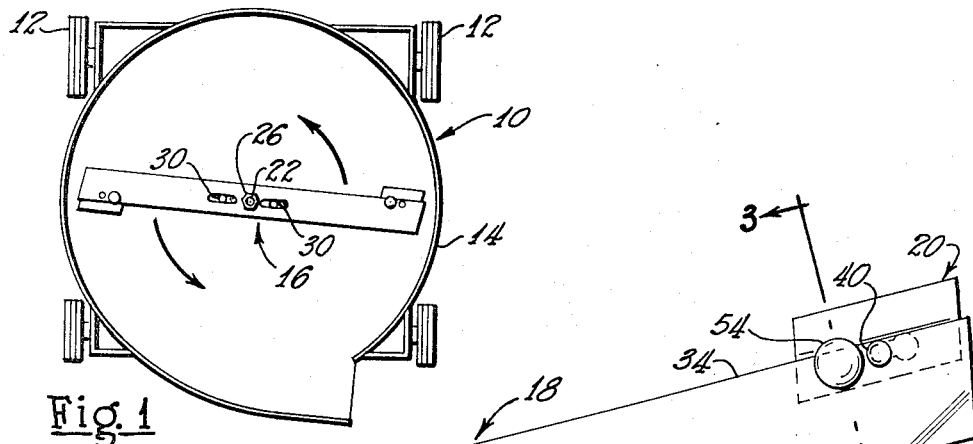
FIG. 1 is a schematic bottom view of a rotary mower utilizing a cutting blade assembly according to the invention.
Figure 2:
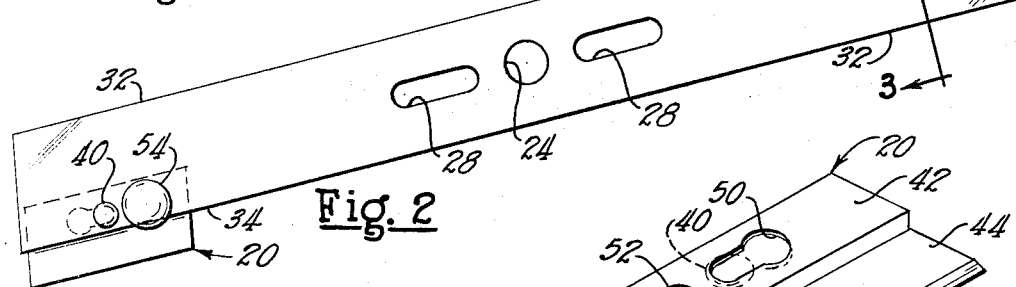
FIG. 2 is a bottom view of the blade assembly shown in FIG. 1.

Referring to the drawings, and more particularly to FIG. 1, a rotary mower embodying the invention is indicated at 10 and includes a plurality of wheels 12 and a shroud 14 for a cutting blade assembly 16. The blade assembly 16 includes a cutter bar 18 and a pair of replaceable cutting blades 20. The cutter bar 18 is affixed to a drive shaft of a motor for the mower by any suitable means. In this instance, a drive shaft 22 extends through a central opening 24 in the cutter bar, is reduced in diameter, and is threaded to receive a bolt 26. The cutter bar also includes a pair of slots 28 which receive pins 30 mounted on a member (not shown) rotatable with the drive shaft. The specific means employed to connect the drive shaft and the cutter bar, however, do not constitute part of the invention.

Figure 3:
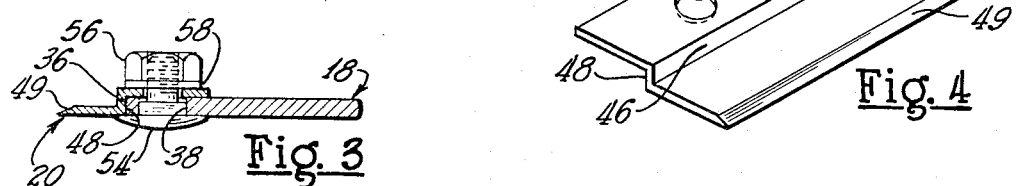
FIG. 3 is a view in transverse cross section taken along the line 3—3 of FIG. 2.

The cutter bar 18 is of relatively simple construction, being of generally rectangular shape, or more accurately, of trapezoidal shape with slanted ends. Rear or trailing edges 32 of the bar 18 can be bent upwardly slightly, as is well known, to produce an up-draft which thereby tends to straighten the grass blades prior to cutting. Forward edges 34 of the bar 18 are parallel to the rear ones and form vertical surfaces 36, at least in the area of and extending the length of the cutting blades 20, as shown in FIG. 3. In addition, the cutter bar 18 has, near each end, a non-circular opening 38 to receive a fastener and a rivet 40 for attaching the cutting blade 20. The rivet extends through a hole in the bar 18 and is riveted at the lower surface of the bar.

Figure 4:
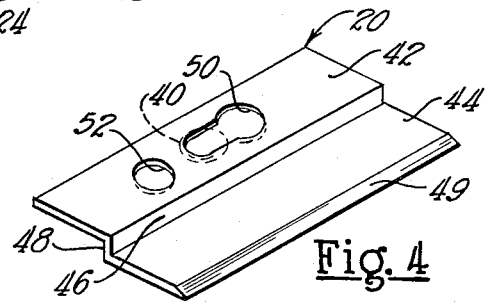
FIG. 4 is an enlarged view in perspective of a cutting blade forming part of the assembly shown in FIG. 2.

Each of the cutting blades 20, as shown specifically in FIG. 4, includes an upper planar portion 42 and a lower planar portion 44 connected by an offset portion 46 forming a vertical rear surface 48 lying contiguous with the vertical surface 36 of the forward edge 34 of the cutter bar 18. A beveled cutting edge 49 extends the length of the planar portion 44.

The planar portion 42 of the blade 30 includes a keyhole-shaped opening 50 including an enlarged portion and a slotted portion for receiving a head of the rivet 40. Spaced from the opening 50 is a circular opening 52 to receive a shank of a bolt 54 onto which is turned a nut 56 to fasten the cutting blade 20 to the cutter bar 18, with a lock washer 58 therebetween. The bolt 54 has a non-circular or square portion cooperating with the non-circular or square opening 38 to prevent the bolt from rotating relative to the cutter bar and the cutting blade. The lock washer 58 prevents the nut 56 from turning so that a secure connection is obtained which virtually cannot be loosened by vibration. The combination of the rivet 40 and the bolt 54 provide inexpensive fastener means for the blade and bar and yet means which can be quickly assembled and disassembled.

In attaching the cutting blades 20 to the cutter bar 18, the enlarged portions of the openings 50 are simply aligned with the heads of the rivets 40 and placed thereover with the blades then being pushed outwardly along the bar 18 to move the rivet shanks into the narrow portions of the openings. At this itme, the circular openings 52 are aligned with the non-circular openings 38 in the cutter bar and the bolts 54 then simply inserted and the lock washers and nuts assembled therewith. The fasteners cannot work loose from the blade and bar and, even if the bolt 54 should loosen, the rivet 40 will still prevent the blade from being thrown outwardly. Further, the fasteners cannot be deformed in a manner such as to render difficult the replacement of the blades.

As shown particularly in FIG. 3, the vertical surface 48 provided by the offset 46 of the cutting blade 20 is contiguous with or abutting the vertical surface 36 of the leading edge 34 of the cutter bar 18. In this manner, when the blades 20 strike a foreign object, such as a stone, the force is transmitted through the contiguous surfaces directly to the cutter bar 18 and not through the fasteners constituting the rivets 40 and the bolts 54. This substantially eliminates shock on the rivets and bolts and prevents them from shearing and being thrown outwardly at high speeds as heretofore has occurred. Hence, the fasteners in this instance simply serve to retain the blades on the cutter bar by overcoming centrifugal force and by resisting any occasional upward force on the blades.

Figure 5:
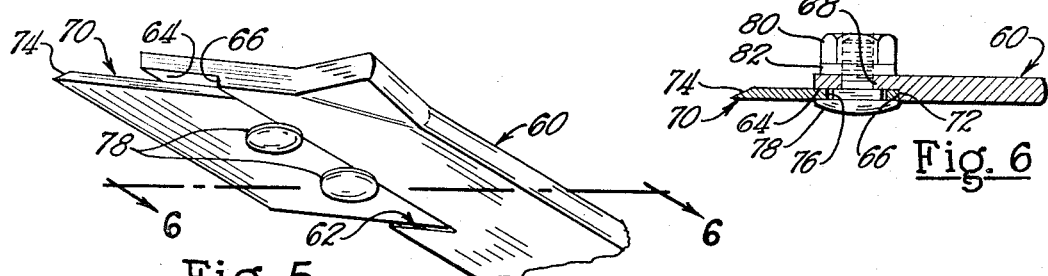
FIG. 5 is a fragmentary view in perspective of a slightly modified blade assembly.
Figure 6:
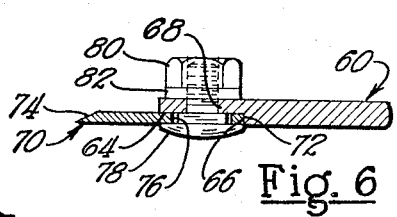
FIG. 6 is a view in transverse cross section taken along the line 6—6 of FIG. 5.

A slightly modified embodiment of the invention is shown in FIGS. 5 and 6. In this instance, a cutter bar 60 is basically similar to the cutter bar 18 but has a generally rectangular or trapezoidal recess 62 formed in the lower surface of the cutter bar 60 by a coining operation. The recess 62 includes a main planar surface 64 and a vertical, radial or longitudinal surface 66 which serves the same purpose as the vertical surface 36 of the cutter bar 18. The cutter bar also includes two circular holes 68 to receive bolts.

A cutting blade 70, in this instance, is of relatively simple planar shape and includes a rear edge forming a vertical surface 72 and a forward, beveled cutting edge 74. The blade 70 also includes two spaced, non-circular holes 76 aligned with the holes 68. Bolts 78 are inserted through the aligned holes 76 and 68, with the bolts having non-circular portions received in the non-circular holes 76 to prevent the bolts from turning. Again, the nuts 80 and lock washers 82 are used with the bolts 78 to assemble the blade 70 with the cutter bar 60. Two of the bolts 78 are used rather than one and a rivet because the blade cannot be moved longitudinally outwardly in the recess 62 unless it is made much longer than the blade.

In the event that the blades 70 strike a foreign object, the impact is transmitted directly through the vertical surfaces 66 of the bar 60 and the surfaces 72 of the blade 70 so that again no force is transmitted through the fasteners or bolt 78.

It will be seen from the above that the cutter blade assemblies are of simple, reliable, low-cost design and are as safe as possible since there is substantially no chance that the blades or fasteners attaching the blades to the bars can break or shear and be thrown outwardly.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. A mower cutting blade assembly for a rotary mower comprising an elongate cutting bar having parallel, straight, longitudinal edges, said cutter bar having means for making a connection with a drive shaft of an engine of the mower, said cutter bar having fastener openings at the ends thereof. a pair of cutting blades, each having a planar portion and a straight cutting edge therealong, each of said cutting blades also having at least two spaced openings to receive fasteners, said blades having surfaces lying perpendicular to the planes of said cutting blades and said bar having surfaces lying perpendicular to the plane of said cutter bar and abutting said blade surfaces, whereby impact on said blades is transmitted directly to said bar through said surfaces, said surfaces being in contact for the full length of said blades, and fasteners extending through the openings in said blades and said bar and attaching said blades to said bar with said surfaces in contact.

2. An assembly according to claim 1 wherein one of said blade openings of each of said blades includes an enlarged portion and a narrow slot portion and one of said fasteners for each of said blades includes a rivet member affixed to said cutter bar and having an enlarged head receivable through said enlarged portion of said one opening.

3. An assembly according to claim 2 wherein an opening at each end of said cutter bar is non-circular and the fasteners include bolts extending through said non-circular openings and the other of said blade openings, said fasteners also including nuts and lock washers received on said bolts.

4. An assembly according to claim 1 wherein said fasteners include bolts with non-circular portions with some of said openings being non-circular and cooperating with said non-circular bolt portions to prevent said bolts from turning, and said fasteners further include nuts and lock washers for said bolts.

5. A mower blade assembly comprising a cutter bar having a pair of straight, parallel, longitudinal edges, the forward edges forming planar, vertical surfaces, said cutter bar having openings at the ends thereof to receive fasteners, means for connecting said cutter bar to a drive shaft of an engine of a mower, a pair of replaceable cutting blades, each of said cutting blades having two parallel, planar surfaces with an integral offset connecting said planar surfaces, said offset having a rear vertical surface engageable with one of said vertical surfaces of said cutter bar, the lower planar surface having a straight cutting edge parallel to said offset, said upper planar surface having openings to receive fasteners, and fasteners extending through said openings in said cutter bar and said cutting blades and attaching said blades to said bar with the surfaces in contact.

6. A mower blade assembly comprising a cutter bar having forward edges forming planar, vertical surfaces, said cutter bar having openings at the ends thereof to receive fasteners, means for connecting said cutter bar to a drive shaft of an engine of a mower, a pair of replaceable cutting blades, each of said cutting blades having two parallel, planar surfaces with an integral offset connecting said planar surfaces, said offset having a rear vertical surface engageable with one of said vertical surfaces of said cutter bar, the lower planar surface having a cutting edge, and the upper planar surface having two openings to receive fasteners, and fasteners extending through said openings in said cutter bar and said openings in said cutting blades and attaching said blades to said bar with the surfaces in contact.

7. An assembly according to claim 6 wherein one of said blade openings of each of said blades includes an enlarged portion and a narrower slot portion and one of said fasteners for each of said blades includes a rivet member affixed to said cutter bar and having an enlarged head receivable through said enlarged portion of said one opening.

8. A mower blade assembly comprising a cutter bar having forward edges forming planar surfaces transverse to the plane of rotation of the bar, a pair of replaceable cutting blades, each of said cutting blades having two parallel, planar surfaces with an integral offset connecting said planar surfaces, said offset having a rear surface transverse to the plane of rotation of the bar and engageable with one of said surfaces of said cutter bar, the lower planar surface having a cutting edge, and fasteners attaching said cutting blades to said cutter bar with the surfaces of said blades and bar in contact.

9. A mower blade assembly comprising a cutter bar having a pair of straight, parallel, longitudinal edges, the lower surfaces of said cutter bar at the outer ends thereof being recessed, with the bottom of each recess being parallel to the upper surface of said bar and with the rear edge of each of the recesses forming a straight vertical surface parallel to the forward edge of the cutter bar, said cutter bar having fastener-receiving openings through end portions thereof at said recesses, means for connecting said cutter bar to a drive shaft of a mower engine, a pair of planar cutting blades having openings to receive fasteners, said blades having straight rear edges forming vertical surfaces and cutting edges at the opposite edges, said cutting blade vertical surfaces abutting the rear vertical surfaces of said recesses of said cutter bars, and fasteners extending through the openings of said blades in said bar and affixing said cutting blades to said bar.

10. A mower blade assembly comprising a cutter bar, the lower surfaces of said cutter bar at the outer ends thereof being recessed, with the bottom of each recess being planar and with the rear edge of each of the recesses being straight and forming a vertical surface extending longitudinally of the bar, said cutter bar having two fastener-receiving openings through end portions thereof at said recesses, means for connecting said cutter bar to a drive shaft of a mower engine, a pair of planar cutting blades each having two openings to receive fasteners, said blades having straight rear edges forming vertical surfaces and cutting edges at the opposite edges, said cutting blade vertical surfaces abutting the rear vertical surfaces of said recesses of said cutter bars, and fasteners extending through the openings of said blades in said bar and affixing said cutting blades to said bar.

11. An assembly according to claim 10 wherein said fasteners include bolts with non-circular portions with some of said openings being non-circular and cooperating with said non-circular bolt portions to prevent said bolts from turning, and said fasteners further include nuts and lock washers for said bolts.

12. A mower blade assembly comprising a cutter bar, surfaces of said cutter bar at the outer ends thereof being recessed with the bottom of each recess being planar and with the rear edge of each of the recesses forming a surface extending transversely to the plane of rotation of the bar, a pair of planar cutting blades having straight rear edges forming surfaces extending transversely to the plane of rotation of the bar, and having cutting edges at the opposite edges, said cutting blade surfaces abutting the rear surfaces of said recesses of said cutter bars, and means affixing said cutting blades to said bar at said recesses with said surfaces in contact.

13. An assembly according to claim 3 wherein said rivet members are closer to the ends of said cutter bar than said bolts.

14. A cutting blade for an elongate cutter bar of a rotary mower, said cutter bar having a straight, longitudinal edge portion at each end thereof, said cutting blade comprising a planar portion having a straight cutting edge extending therealong, said blade having a second planar portion with at least one opening to receive a fastener for affixing said second planar portion to the top of said cutter bar, said blade having a surface intermediate said first and second planar portions lying perpendicular to the planes of both of said portions and having a height substantially equal to the thickness of said cutter bar.

15. A cutting blade for an elongate cutter bar of a rotary mower, said cutter bar having a straight, longitudinal edge portion at each end thereof, said cutting blade comprising a planar portion having a straight cutting edge extending therealong, said blade having a second planar portion having two spaced openings therealong to receive fasteners for affixing said second planar portion to the top of said cutter bar, said blade having a surface intermediate said first and second planar portions lying perpendicular to the planes of both of said portions.

16. A cutting blade according to claim 15 wherein the opening toward the left-hand edge of said cutting blade, when viewed with the second planar portion above the first planar portion and facing the cutting edge, being circular, and with the opening toward the right-hand end of the blade constituting a circular portion and a slot portion extending toward the left-hand opening.

17. A mower cutting blade assembly for a rotary mower comprising an elongate cutter bar having parallel, straight longitudinal edges over at least most of the length of said bar, said cutter bar having means for making a connection with the drive shaft of an engine of the mower, said cutter bar having two fastener openings at each end thereof with the opening near the end being circular and the other opening being non-circular, a pair of cutting blades, each having a first planar portion having a beveled, straight cutting edge therealong, each of said cutting blades also having a second planar portion having two spaced openings to receive fasteners with a first of said blade openings being above said circular opening of said cutter bar and having an enlarged portion and a slot portion aligned with said circular opening, said slot portion extending parallel to the longitudinal extent of said cutter bar and directed away from the end of the cutter bar, a second of said blade openings being circular and aligned with the non-circular opening of said cutter bar, each of said blades having an offset surface lying perpendicular to the planes of said first and second planar portions and having a height substantially equal to the thickness of said cutter bar with the offset surface abutting a portion of a longitudinal edge of said cutter bar whereby impact on said blade is transmitted directly to said bar through said offset surface, a bolt for each blade including a head, a non-circular shank portion adjacent said head, and a threaded portion beyond said non-circular portion, said head lying immediately below the lower surface of said cutter bar and said non-circular portion cooperating with said non-circular opening of said cutter bar to prevent rotation of said bolt and said threaded shank portion extending above said second planar portion of said cutting blade, nut means threadedly engaged with said bolt above said second planar portion, and a rivet having a head and a shank with the head of said rivet lying immediately above the second planar portion and with the rivet shank extending through said slot portion of said first cutting blade opening with the end of said shank extending through said circular opening of said cutter bar and riveted to said cutter bar.

18. A mower cutting blade assembly for a rotary mower comprising an elongate cutter bar having parallel, straight longitudinal edges over at least most of the length of said bar, said cutter bar having means for making a connection with the drive shaft of an engine of the mower, said cutter bar having two fastener openings at each end thereof, a pair of cutting blades, each having a first planar portion having a cutting edge therealong, each of said cutting blades also having a second planar portion having two spaced openings to receive fasteners with a first of said blade openings being above one of said cutter bars and having an enlarged portion and a slot portion aligned with said one opening, said slot portion extending parallel to the longitudinal extent of said cutter bar, a second of said blade openings being circular and aligned with the other opening of said cutter bar, each of said blades having an offset surface lying perpendicular to the planes of said first and second planar portions and having a height substantially equal to the thickness of said cutter bar with the offset surface abutting a portion of a longitudinal edge of said cutter bar whereby impact on said blade is transmitted directly to said bar through said offset surface, a first fastener extending through said one cutter bar opening and said first cutting blade opening, and a second fastener extending through said other cutter bar opening and said second blade opening.

References Cited

UNITED STATES PATENTS 2,932,147  4/1960  Beeston _____ 56—295

ABRAHAM G. STONE, *Primary Examiner.*

ANTONIO F. GUIDA, *Examiner.*